United States Patent [19]

Dawson

[11] 4,155,528

[45] May 22, 1979

[54] KNOCK-DOWN TYPE OF MOUNTING DEVICE

[76] Inventor: Donald C. Dawson, 2135 Radcliffe Dr., Westlake, Ohio 44145

[21] Appl. No.: 892,017

[22] Filed: Mar. 31, 1978

[51] Int. Cl.² ............................................. F16F 15/04
[52] U.S. Cl. ..................................... 248/674; 248/231
[58] Field of Search ...................... 248/14, 15, 16, 26, 248/358 R, 231; 416/246; 310/91

[56] References Cited

U.S. PATENT DOCUMENTS

| | | | |
|---|---|---|---|
| 2,073,868 | 3/1937 | Fladeland | 416/246 |
| 2,096,621 | 10/1937 | Skolfield | 248/15 |
| 2,474,668 | 6/1949 | Herbolsheimer | 248/188 |
| 2,959,388 | 11/1960 | Fogle | 248/231 |
| 2,987,242 | 6/1961 | Mazzacane | 248/15 X |
| 3,508,729 | 4/1970 | Wilson | 248/15 X |
| 3,612,460 | 10/1971 | Smith | 248/231 |
| 3,847,330 | 11/1974 | Morrison | 417/363 X |

Primary Examiner—J. Franklin Foss
Attorney, Agent, or Firm—Fay & Sharpe

[57] ABSTRACT

A new and improved knock down type of mounting device particularly adapted for mounting an electric motor or other body in a desired position relative to associated structure. The device includes an adjustable band clamp adapted to be closely received peripherally around the motor housing. This band clamp has a plurality of outwardly extending dimples disposed across the width thereof at spaced intervals therearound for defining a plurality of inwardly facing leg receiving areas. The device also includes a plurality of separate mounting legs. One end area of each leg is adapted to be closely captured between the band clamp and motor in an associated one of the receiving areas. Each dimple has a laterally disposed through slot which receives a portion of a radially outward extending flange included on the one end area of the associated leg. Another portion of the flange is configured to engage the motor housing side wall at spaced apart locations to assist in stabilizing the overall mounting arrangement. The other end area of each leg includes means for fixedly mounting it to some associated structure. The legs may also be configured to include a support lip at the one end area adapted to engage an end face of the motor housing.

16 Claims, 10 Drawing Figures

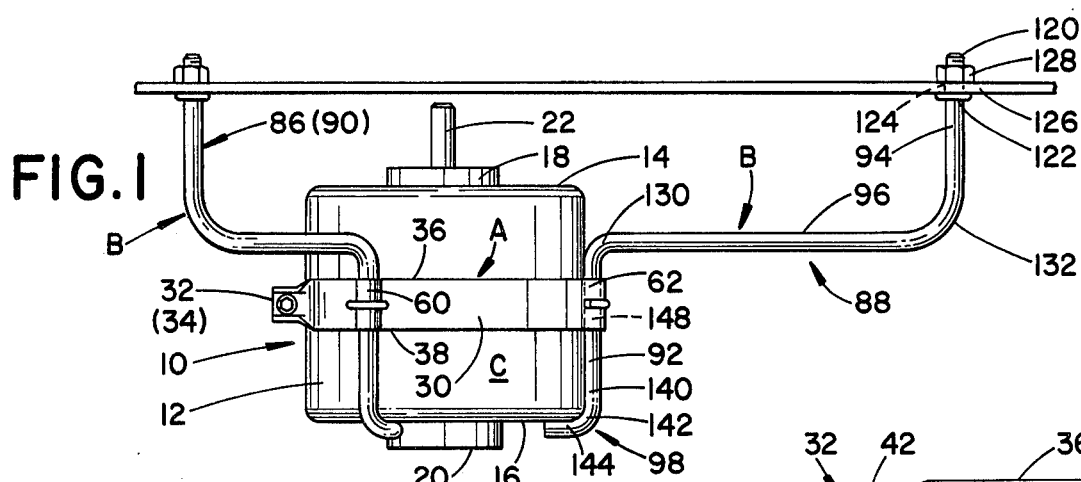
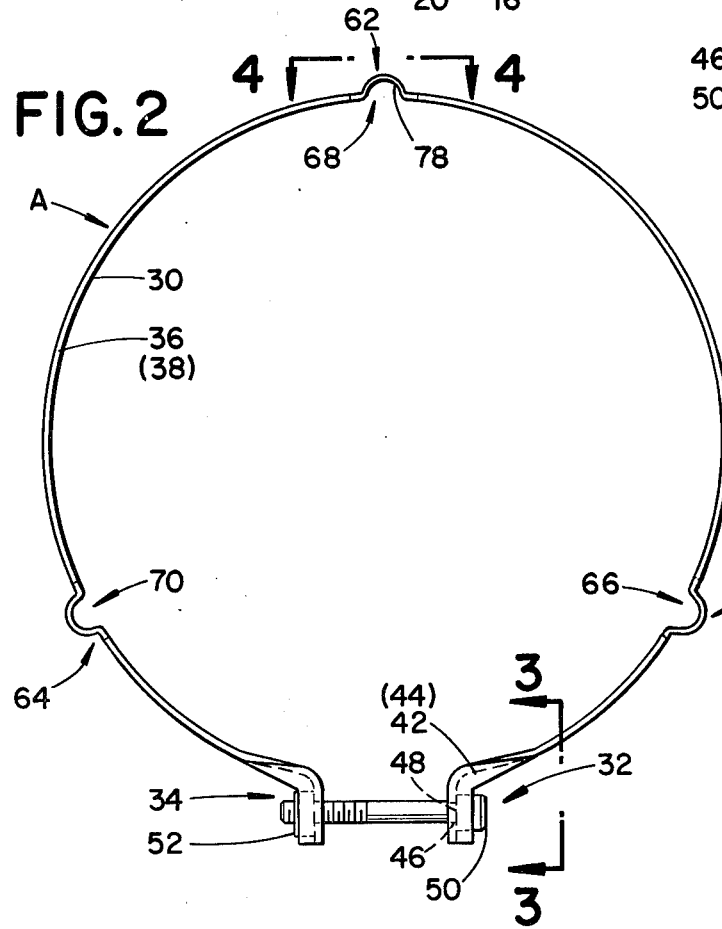
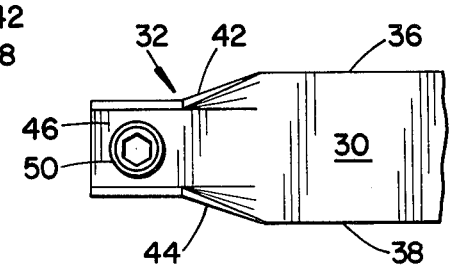
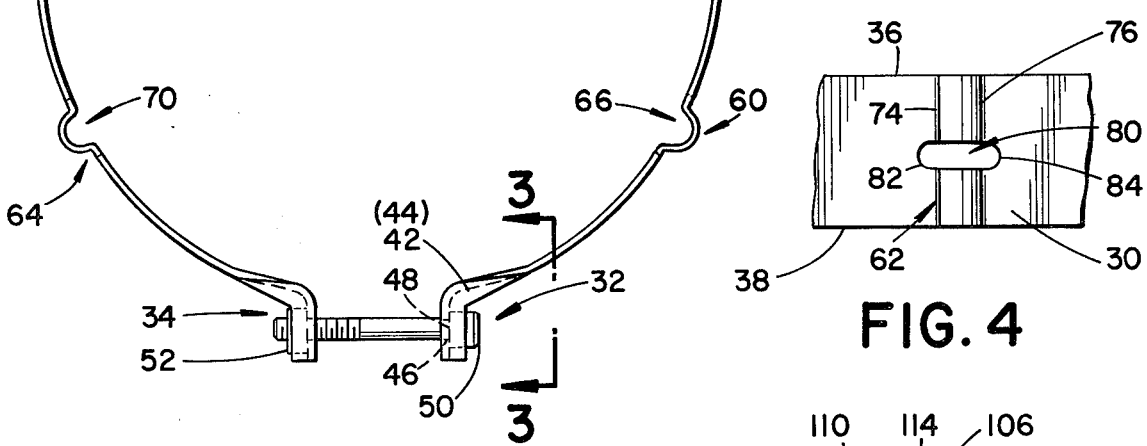
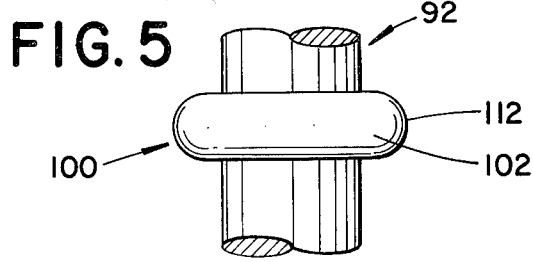
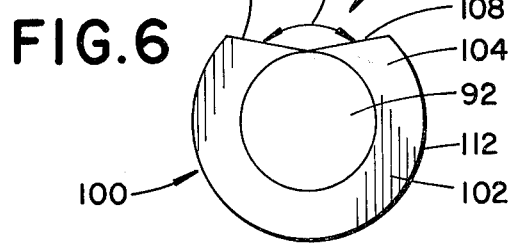

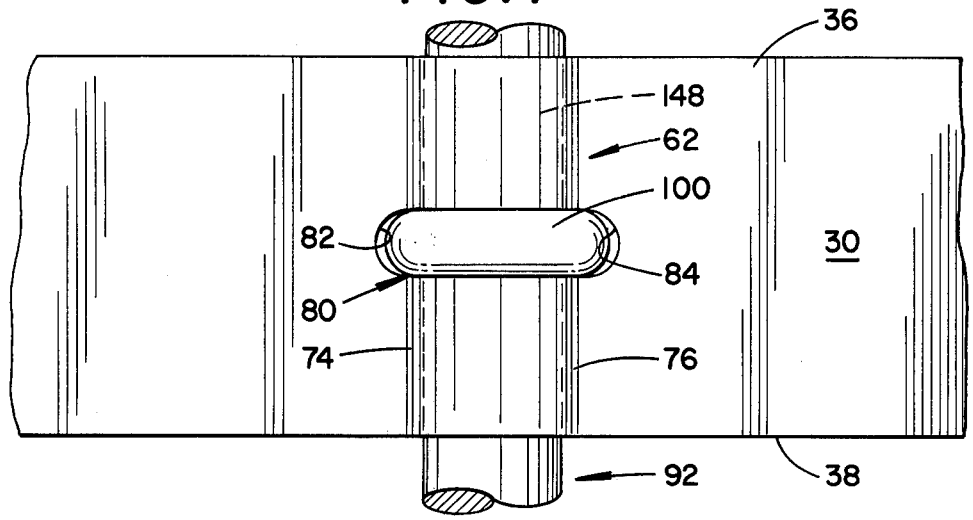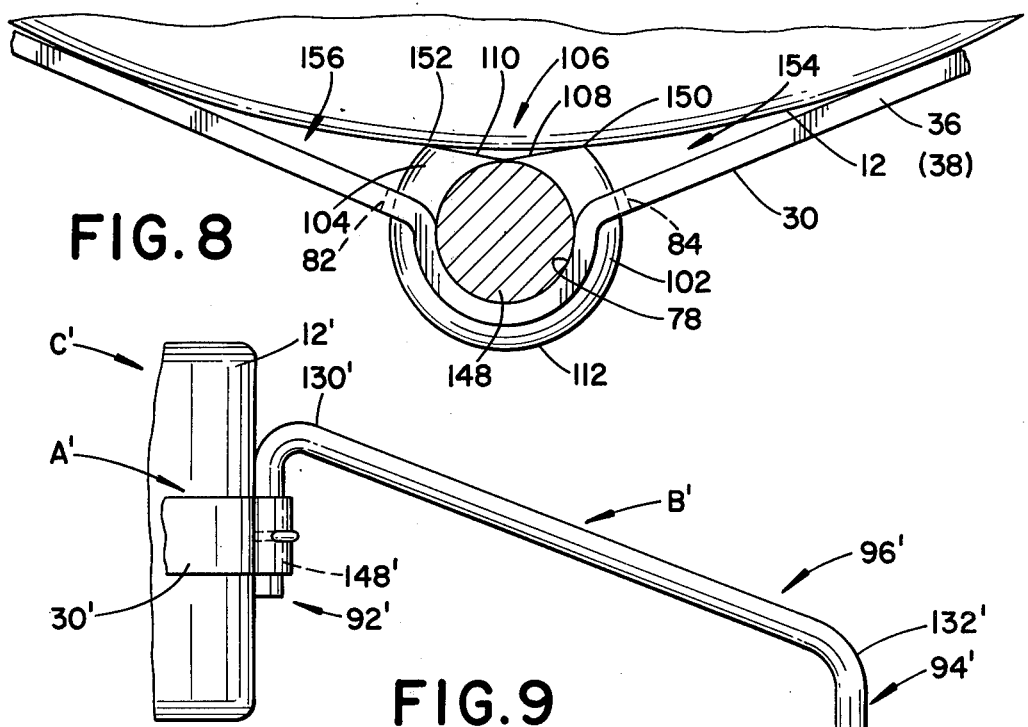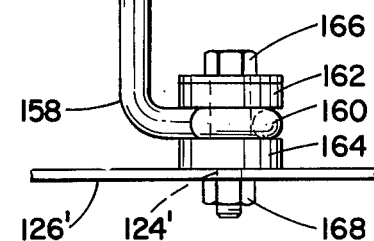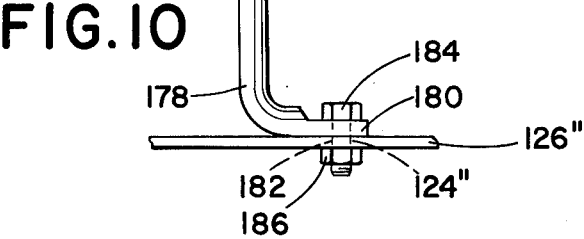

KNOCK-DOWN TYPE OF MOUNTING DEVICE

BACKGROUND OF THE DEVELOPMENT

This development pertains to the art of mounting devices and more particularly to mounting devices of the knock down type.

The development is particularly applicable to a knock down mounting device for use in mounting electric motors and will be described with particular reference thereto. However, it will be appreciated to those skilled in the art that the development has broader applications and may be used for mounting bodies other than electric motors in many types of alternative environments and installations.

Knock down mounting arrangements for electric motors and the like are known in the art. Insofar as electric motors are concerned, such arrangements are oftentimes employed for mounting the motor relative to associated structure in air conditioning units, fan assemblies and so on. Typical of one prior art arrangement of this general type is disclosed in U.S. Pat. No. 2,096,621. The device there shown is employed in a fan assembly and generally comprises a band clamp which is closely received peripherally around the outside of the motor housing. This band clamp includes a plurality of leg receiving loops each adapted to receive one end of a mounting leg. The other end of each mounting leg is mounted to some associated structural portion of the fan assembly. One particular advantage to such a structural arrangement is the fact that it allows relatively unrestricted air flow through the air conditioning unit, fan assembly and so on when the motor is employed to operate a fan blade, pulley or the like.

This prior type of knock down mounting device has several structural draw backs which detract from its effective use. First, such prior devices have not fully accommodated positive locating and mounting as between the individual legs and the band clamp. Moreover, the legs did not include structure for allowing them to be positively located against the motor housing side wall. These deficiencies impaired the structural rigidity and reliability for the overall motor mounting arrangement. While U.S. Pat. No. 2,096,621 shows one type of prior knock down mounting device, there have been other prior modified structures incorporating substantially the same concepts disclosed therein.

The modifications have primarily attempted to provide more or better support for the motor between the band clamp and legs. While to some extend overcoming certain of the structural deficiencies inherent in the U.S. Pat. No. 2,096,621, they introduced still other structural deficiencies or shortcomings. Certain of the modified devices necessitated an increase in raw material or manufacturing costs which ultimately increased the overall costs for the mounting device itself. For example, some of these other prior devices incorporated legs formed from sheet metal. As a result, the width of the legs was increased and this adversely affected or restricted forced air flow through the air conditioning unit, fan or the like. Further, these modified knock down type mounting devices still did not provide sufficient positive alignment as between the legs and band clamp or did not provide sufficient positive retention as between the plurality of mounting legs and the motor housing.

Accordingly, it has been found desirable to provide a knock down type mounting device which would overcome the aforementioned disadvantages, could be manufactured from conventionally available materials, is simple in design, inexpensive to manufacture, positive in mounting operation and readily adapted to use in many different environments.

BRIEF DESCRIPTION OF THE DEVELOPMENT

In accordance with the subject development, there is provided a knock down type of mounting device for fixedly mounting a body relative to some associated structure. The mounting device is comprised of a clamp member adapted to closely peripherally surround the body in retaining engagement therewith. This clamp member has a peripheral dimension as measured therearound greater than the width dimension as measured between opposed clamp side edges. The clamp includes a plurality of outwardly disposed dimples which define inwardly facing leg receiving areas at spaced intervals along the peripheral dimension. The dimples and resultant receiving areas each extend at least partially across the width of the clamp from one of the side edges toward the other. At least one elongated through slot is associated with and disposed to extend generally transversely across each dimple. Also provided are a plurality of separate mounting legs each having a first body mounting end area and a second leg mounting end area which are interconnected with each other by an intermediate leg section. The first end areas have at least a section thereof adapted to be closely retainingly captured between the body and clamp member in an associated one of the receiving areas. These first end area sections each include at least one generally radially outward extending flange. One portion of the flange is adapted to be received in the at least one elongated slot of that dimple which defines the associated one of the receiving areas and another portion is adapted to engage the wall of the body itself. Each mounting leg second end area includes means for affixing the leg to some associated structure whereby the body may be fixedly mounted in a desired position relative thereto.

In accordance with another aspect of the present development, the dimples define receiving areas which have generally semi-circular transverse cross-sections and at least the first end area sections have generally circular cross-sections. This arrangement allows the legs to be advantageously constructed from conventional round stock or the like with the receiving areas and sections being relatively dimensioned for permitting the sections to be closely confined by the receiving areas. Typically, the radius of each first end area section is generally no greater than the radius of the associated one of the receiving areas.

In accordance with still another aspect of the present development, the another portion of each first end section flange includes a relieved area so that it will engage the wall of the body at two spaced apart areas.

Preferably, each flange has a generally annular configuration with the another portion relieved area generally being defined by a pair of side walls extending inwardly from the outer peripheral edge of the flange and converging toward each other at an included angle generally in the range of 150° to 170°. This arrangement is such that the another portion will engage the wall of the body at two spaced apart areas of line contact.

In accordance with a more limited aspect of the present development, the dimples and receiving areas extend entirely across the width of the clamp member between the opposed side edges. At least one of the plurality of legs further includes a body support section extending from the first body mounting end area on the other side thereof from the leg intermediate section. The body support section includes a body support lip adapted to engage the body for assisting in preventing axial movement of the body relative to the mounting device.

The principal object of the present development is the provision of a new and improved knock down type mounting device for mounting a body relative to associated structure.

Another object of the present development is the provision of a new and improved knock down type mounting device which is simple in design and easy to manufacture from conventionally available materials.

A further object of the present development is the provision of a new and improved knock down type mounting device which provides improved positive cooperation between the device components and improved positive mounting cooperation between the device and the body itself.

Still another object of the present development is the provision of a new and improved knock down type mounting device which has a greater degree of flexibility for allowing a number of different types of bodies to be desirably mounted in a number of different environments and installations.

Other objects and advantages for the subject development will become apparent to those skilled in the art upon a reading and understanding of the following specification.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein:

FIG. 1 is a side elevational view showing the overall structural concepts contemplated by the subject development;

FIG. 2 is a plan view showing the band clamp employed with the subject development;

FIG. 3 is a cross-sectional view taken along lines 3—3 of FIG. 2;

FIG. 4 is a cross-sectional view taken along lines 4—4 of FIG. 2;

FIG. 5 is a partial side elevational view showing the leg mounting flange for one of the legs;

FIG. 6 is a plan view of the leg mounting flange in FIG. 5;

FIG. 7 is a partial side elevational view showing the cooperative relationship between one leg and the band clamp;

FIG. 8 is a plan view of the arrangement shown in FIG. 7;

FIG. 9 is a partial side elevational view showing an alternative leg structure utilizing the concepts of the subject development; and, FIG. 10 is a partial side elevational view showing a still further alternative leg mounting arrangement.

DETAILED DESCRIPTION OF THE PREFERRED AND ALTERNATIVE EMBODIMENTS

Referring now to the drawings wherein the showings are for purposes of illustrating the preferred and alternative embodiments of the invention only and not for purposes of limiting same, the FIGURES show the subject knock down type mounting device as being comprised of a band clamp A and a plurality of mounting legs B adapted to cooperate with each other for fixedly mounting an electric motor C in some desired position relative to associated structure. The subject development is particularly applicable to mounting electric motors in fan assemblies, air conditioning units and the like and will be hereinafter described with reference thereto. However, it will be readily appreciated that the development is equally applicable to use for mounting other types of bodies in other environments and installations.

With reference to FIG. 1, the typical electric motor C includes a motor housing generally designated 10 having a generally cylindrical side wall 12 with opposed front and rear faces 14,16. Bearing assemblies 18,20 are respectively disposed in faces 14,16 for supporting a conventional drive shaft 22 protruding outwardly from base 14. A fan blade, pulley or the like (not shown) may be mounted to drive shaft 22 by conventional means.

With particular reference to FIGS. 1-4, band clamp A is shown as having a band clamp body 30 with opposite ends 32,34 and opposed lateral side edges 36,38. In the preferred arrangement here under discussion, the length or peripheral dimension of clamp body 30 as measured around the body between ends 32,34 is substantially greater than the width dimension as measured between side edges 36,38. Also in the preferred embodiment, clamp body 30 is formed from sheet metal such as, for example, 16 gauge galvanized hot rolled steel. This material provides satisfactory mounting strength for the motor while at the same time allowing it to be satisfactorily formed by conventional metal working techniques. However, other materials and gauges could also be utilized without in any way departing from the overall scope of the development.

Ends 32,34 each have an identical but opposite configuration. The specific structural configuration of end 32 will be described with particular reference to FIGS. 2 and 3, it being understood that end 34 is identical thereto. In these two FIGURES, clamp body side edges 36,38 are shown as being formed to define tapered side walls 42,44, respectively, from inwardly adjacent end 32 to the outermost end thereof. At the end, a portion of clamp body 30 is formed to extend generally normally outward from the remainder thereof so as to define an outwardly extending mounting flange 46. Flange 46 includes an opening 48 therethrough and a conventional threaded fastener 50 passes between ends 32,34 through their respective openings 48. A conventional nut 52 is received on fastener 50 at clamp body end 34 in order to retain the ends in close spaced proximity with each other and to facilitate selective tightening of the clamp body on the motor housing as will be better appreciated hereinafter. The clamp body is formed such that ends 32,34 attempt to spring apart from each other.

Referring to FIGS. 1, 2 and 4, clamp body 30 also includes a plurality of spaced apart dimples generally designated 60,62 and 64 which extend outwardly therefrom. In the preferred arrangement, these dimples extend over the entire width of the clamp body between side edges 36,38 generally parallel to the clamp body longitudinal axis and define inwardly facing mounting leg receiving areas 66,68 and 70. For reasons which will become more readily apparent hereinafter, these receiving areas preferably have a generally arcuate or semicircular transverse cross-sectional configuration and the dimples with resultant receiving areas may be conveniently formed in the clamp body by conventional metal working techniques. Moreover, and while three dimples and receiving areas are shown in the drawings, it will be appreciated that a greater or lesser number could be advantageously employed to accommodate a particular installation without in any way departing from the overall intent or scope of the present invention. Still further, in order to balance the overall mounting arrangement, it is preferably desirable to have the receiving areas equidistantly spaced apart from each other around clamp body 30.

FIG. 4 shows a side elevation of dimple 62, it being appreciated that dimples 60 and 64 are identical thereto unless otherwise specifically noted. In FIG. 4, dimple 62 has a pair of opposed side edge areas 74,76 extending laterally between clamp body side edges 36,38. The dimple is formed such that the inside receiving area wall 78 thereof (FIG. 2) has an arcuate or semicircular configuration in transverse cross-section. By way of example only, one preferred arrangement of the subject development contemplates a radius for this receiving area wall of approximately 0.187". An elongated through slot 80 is included in the dimple and is disposed to extend generally longitudinally along the length or peripheral dimension of clamp body 30. The length of this slot is such that opposed slot ends 82,84 are spaced outwardly from dimple side edge areas 74,76, respectively. By way of example only, one preferred embodiment of the present development contemplates slot 80 as having a length between ends 82,84 of approximately 0.687" and a width of approximately 0.187". The specific use and function of slot 80 will be described in greater detail hereinafter.

In FIG. 1, legs B comprise three legs generally designated 86,88 and 90 and are employed in conjunction with band clamp A for mounting the motor in a desired position. Leg 86 is associated with receiving area 66 of dimple 60, leg 88 is associated with receiving area 68 of dimple 62 and leg 90 is associated with receiving area 70 of dimple 64. Typically, these legs are identical to each other and description will hereinafter be made with reference to leg 88, any differences in legs 86 and 90 being specifically noted.

Leg 88 includes a first motor mounting end area 92, a second leg mounting end area 94 with areas 92,94 being interconnected by an intermediate section 96. In the arrangement shown in FIG. 1, leg 88 also includes a body support section 98 disposed on the opposite side of first end area 92 from intermediate section 96. Although a number of materials could be advantageously employed for forming the leg, conventional commercial bar stock or a wire stock is advantageously employed for ease of manufacture. By way of example and in a typical preferred arrangement here under discussion, a radius of the legs at least at first end area 92 is generally no greater than the radius of the receiving area and preferably is in the range of 0.136" to 0.187". Typically, the entire leg will have a constant cross-sectional dimension and from a straight piece of such stock cut to the appropriate length, the leg may thereafter be bent by conventional metal working techniques to form end areas 92,94, intermediate section 96 and support section 98.

With reference to FIGS. 1, 5 and 6, leg 88 includes a radially outwardly extending flange 100 along first motor mounting end area 92. In the preferred arrangement, this flange is defined by a generally annular member received onto the leg and rigidly affixed thereto at the appropriate area. The flange has one portion generally designated 102 which is adapted to be received through the elongated slot 80 in the associated clamp body dimple 62. Another portion 104 of flange 100 includes a generally V-shaped relieved area 106. This relieved area is generally defined by side edges 108,110 extending inwardly from the flange peripheral outer edge 112 and converging toward each other at apex area 114. The included angle of this apex area may generally be in the range of 150° to 170°, although an angle of approximately 160° is preferred. By way of example, in the preferred arrangement here under discussion, the diameter of annular flange 100 is approximately 0.625" and the thickness is approximately 0.187". Relieved area 106 is such that positive locating and retaining contact may be made between the flange portion 104 and the housing side wall of motor C as will become more readily apparent hereinafter.

Referring to FIG. 1, second leg mounting end area 94 of leg 88 includes a threaded area 120 at the terminal end thereof and a stop flange or collar 122 at the innermost end of the threaded area. This flange may similarly comprise an annular member closely received over the leg and subsequently rigidly affixed thereto by convenient means, although alternative flange or collar defining means may also be advantageously employed. Threaded area 120 is adapted to be inserted through a mounting opening 124 included in some associated structure generally designated 126 to which the motor itself is to be mounted. Such associated structure may comprise apparatus framework, cross braces and the like and will vary from installation to installation. A conventional nut 128 is threadedly received onto threaded area 120 and advanced thereon until associated structure 126 is closely received between the nut and stop flange or collar 122.

Bend area 130 separating first motor mounting end 92 and intermediate section 96 and bend area 132 separating second leg mounting end area 94 and intermediate section 96 may be varied as deemed necessary and/or appropriate to accommodate a particular mounting arrangement. That is, the specific leg configuration of FIG. 1 is dictated by the particular desired mounting for electric motor C relative to the associated structure. The relative lengths of the individual areas 92,94 and section 96 may be similarly varied as desired.

With continued reference to FIG. 1, the body support section generally designated 98 is comprised of an elongated straight section 140, a bend area designated 142 and a second portion 144 which defines a support lip. The length of section 140 is such that when band clamp A and legs B are properly installed on electric motor C, lip 144 will engage motor housing rear face 16. This arrangement provides additional support for the motor and assists in preventing axial movement of the motor relative to the band clamp in at least one direction.

With reference to FIGS. 1, 7 and 8, description will hereinafter be made with regard to installing the the subject knock down type mounting device on electric motor C for mounting the motor in a particular desired position relative to some associated structure. The individual legs 86,88 and 90 may first be loosely positioned in their associated receiving areas 66,68 and 70 within clamp body 30. In this position, the one portion 102 of the flange 100 associated with each leg is received through elongated slot 80 included in the associated dimple. Also at this time, nut 52 is retracted along threaded fastener 50 an amount sufficient to allow clamp body ends 32,34 to spread apart from each other to an extent such that the peripheral dimension of the clamp body is greater than the peripheral dimension of motor housing cylindrical side wall 12.

The motor itself may then be placed within the clamp body to the position shown in FIG. 1 such that the two are generally coaxial with each other and wherein end face 16 engages lips 144 of the body support sections. Thereafter, nut 52 may be advanced onto threaded fastener 50 to force clamp body ends 32,34 toward each other and thereby bring the clamp body at least into a snug fitting relationship with the motor housing side wall. The motor and knock down type mounting device may thereafter be positioned within and mounted to an associated structure 126 by means of second leg mounting end areas 94 as described above. Thereafter, nut 52 may be further advanced onto threaded fastener 50 so as to bring clamp body 30 into a close fitting retaining relationship with the motor housing cylindrical side wall. The order of the above assembly steps may, of course, be varied to accommodate a particular installation but they will nevertheless allow those skilled in the art to appreciate a typical installation of the subject device.

When fully installed and with continued reference to FIGS. 1, 7 and 8, a relatively short section 148 of first motor mounting end 82 of each leg 86,88 and 90 will be positively captured between the motor housing and clamp band in the associated one of the receiving areas 66,68 and 70. This arrangement for one of the legs is particularly discernible from both FIGS. 7 and 8. In FIG. 7, it will be seen that the aforementioned typical preferred relative dimensioning between the receiving area and at least body mounting end area 92 of the leg is such that side to side movement of the leg relative to the band clamp is prevented. Moreover, the aforementioned typical preferred relative dimensioning between the width of slot 80 and thickness of flange 100 is such that relative up and down movement between the clamp band and legs is prevented. Still further, and as seen in FIG. 8, relieved area 106 is such that the another portion 104 of flange 100 engages side wall 12 of the motor housing side wall at two spaced apart areas 150,152. Also, and because of the configuration of relief area 106, contact areas 150,152 substantially comprise two spaced apart areas of line contact. This configuration provides added stability for the overall mounting arrangement and acts to prevent rotational movement of the legs relative to the motor and band clamp when the clamp is fully retainingly tightened circumferentially around the motor housing.

As will also be seen in FIG. 8, the relative dimensioning between flange 100, motor mounting end area 92 and motor housing side wall 12 is such that small air gaps 154,156 are provided between the band clamp and motor housing at each side of section 148 motor mounting end area 92. This assures that there will be positive contact at this area only between portion 104 of flange 100 and motor housing side wall 12 so as to further assure obtaining a positive located relationship between the motor and legs. The overall structure of the devices described above provides a successful solution to those structural and operational problems encountered with prior art knock down type mounting devices of a similar character.

FIG. 9 shows a modified leg structure which may also be utilized in successfully practicing the overall concepts of the subject development. For ease of illustration and appreciation of this modification, like components are identified by like numerals with the inclusion of a primed (') suffix and new components are identified by new numerals.

In FIG. 9, the overall leg structure B' eliminates use of the body support sections described hereinabove with reference to FIGS. 1–8. Here also, first motor mounting end area 92' has been shortened so that it extends only slightly outwardly from section 148' which is captured between band clamp 30' and motor housing side wall 12' in the associated receiving area. The retaining force obtained from the subject device when the band clamp is tightly peripherally mounted on the motor is sufficient to retain the motor in position.

Also in FIG. 9, second leg mounting end area 94' includes a modified arrangement for mounting the leg to some associated structure. More particularly, end area 94' includes a terminal section 158 bent generally transverse to area 94' and having a hook-like area 160 formed at the distal end thereof. For mounting the leg to associated structure 126', there is provided upper and lower retaining washers 162,164 received on each side of hook-like area 160. A conventional threaded fastener 166 is then passed through the washers and hook-like area and through opening 124' in associated structure 126' for conventionally threadedly receiving a nut 168. This nut is tightened on the bolt so as to fixedly secure the leg to the associated structure.

FIG. 9 also demonstrates the aforementioned versatility of the subject device. Particular note should be taken that bend areas 130',132' are such to define a different overall elevated relationship between end areas 92',94'.

FIG. 10 shows a still further modified end arrangement for the legs. In FIG. 10, like components are identified by like numerals with the inclusion of a doubled primed ('') suffix and new components are identified by new numerals.

Here, second leg mounting end areas 94'' includes a terminal section 178 which is angled generally normal to the remainder of the end area. The distal end of this terminal area is flattened by conventional metal working techniques to provide a slightly enlarged mounting area and includes a mounting opening 182 therethrough. A conventional threaded fastener 184 and nut 186 are then employed to mount the leg to associated structure 126'' at opening 124'' therein.

The subject development has been described with reference to the preferred and alternative embodiments. Obviously, modifications and alterations are possible and will occur to others upon the reading and understanding of this specification. For example, it is possible to construct the legs from a spring wire in order to provide improved vibration damping effects if so desired. Moreover, it is also possible to provide still other modified leg mounting structures and leg configurations than those disclosed hereinabove, and to vary the typically preferred exemplary dimensional relationships as also set forth hereinabove. However, it is my intention to include all such modifications and alterations insofar as they come within the scope of the appended claims or the equivalents thereof.

Having thus described my development, I now claim:

1. A knock down type mounting device for fixedly mounting a body relative to associated structure, said mounting device comprising:
   a clamp member adapted to closely peripherally surround said body in retaining engagement therewith wherein said clamp member has a peripheral dimension as measured therearound greater than the width dimension as measured between opposed clamp side edges, said clamp having a plurality of outwardly disposed dimples defining inwardly facing leg receiving areas at spaced intervals along said peripheral dimension with said dimples and resultant receiving areas extending at least partially across the width of said clamp member from one of said side edges, said clamp further including at least one elongated through slot associated with and extending generally transversely across each dimple; and, a plurality of separate mounting legs having a first body mounting end area and a second leg mounting end area interconnected by an intermediate leg section with the first body mounting end area of each leg having at least a section thereof adapted to be closely retainingly captured between said body and clamp member in an associated one of said receiving areas, each first end area section including at least one generally radially outward extending flange having one portion thereof adapted to be received in the elongated slot of that dimple defining the associated one of said one receiving areas and another portion thereof adapted to engage said body, the second end area of each leg including means for affixing the leg to said associated structure whereby said body may be fixedly mounted in a desired position relative thereto.

2. The device as defined in claim 1 wherein each said at least one slot is symmetrically disposed on and has a length greater than the width of the associated one of said dimples.

3. The device as defined in claim 1 wherein said plurality of dimples define receiving areas having generally semi-circular transverse cross-sections and at least said section of each leg first body mounting end area has a generally circular cross-section, said receiving areas and sections being relatively dimensioned such that said sections are adapted to be received in and closely confined by said receiving areas.

4. The device as defined in claim 3 wherein the radius of each said first end area section is generally no greater than the radius of the associated one of said receiving areas.

5. The device as defined in claim 1 wherein said another portion of said flange on each said first end area section includes a relieved area adapted to permit said flange another portion to engage said body at least at two spaced apart areas.

6. The device as defined in claim 5 wherein each flange has a generally annular configuration with said another portion relieved area being generally defined by a pair of side walls extending inwardly from the outer peripheral edge of said flange and converging toward each other at an included angle generally in the range of 150° to 170° whereby said another portion is adapted to engage said body at two spaced apart areas of line contact.

7. The device as defined in claim 1 wherein said dimples and receiving areas extend entirely across the width of said clamp between said side edges and wherein at least one of said plurality of legs further includes a body support section extending from said first body mounting end area on the other end thereof from said leg intermediate section, said body support section including a body support lip adapted to engage a portion of said body for assisting in preventing axial movement of these relative to said clamp member.

8. A mounting device particularly adapted for fixedly securing an electric motor of the type having a generally cylindrical motor housing side wall with opposed housing ends to some associated structure, said device comprising:

an adjustable band clamp adapted to closely peripherally surround said motor housing side wall in retaining engagement therewith with the longitudinal axes of said motor housing and band clamp generally coaxially disposed relative to each other, said band clamp having a plurality of outwardly disposed dimples defining inwardly facing arcuate leg receiving areas at spaced intervals therearound with said dimples and receiving areas extending across the entire width of said band clamp between opposed band clamp side edges generally parallel to the band clamp longitudinal axis, said band clamp further including at least one elongated through slot associated with and extending generally transversely across each dimple with the length of each said slot being greater than the corresponding width of the associated dimple; and, a plurality of separate mounting legs including a first motor mounting end area having a generally circular cross-section and a second leg mounting end area with said end areas being interconnected by an intermediate section and with the first mounting end area of each leg adapted to have at least a section thereof closely retainingly captured between said motor housing side wall and band clamp in one of said receiving areas, each of said first motor mounting end areas having a radius no greater than the radius of the associated band clamp arcuate receiving area, each of said first mounting end area sections including at least one radially outward extending flange having one portion thereof adapted to register with the elongated slot of that dimple defining the associated receiving area and another portion adapted to engage said motor housing side wall, the second leg mounting end area of each leg including means for affixing the leg to some associated structure whereby said motor may be fixedly secured in a desired position relative thereto.

9. The device as defined in claim 8 wherein said another portion of said flange on each first end section includes a relieved area adapted to permit said flange another portion to engage said motor housing side wall at two spaced apart areas.

10. The device as defined in claim 9 wherein each flange has a generally annular configuration with said another portion relieved area being generally defined by a pair of side walls extending inwardly from the outer peripheral edge of said flange and converging toward each other at an included angle generally in the range of 150° to 170° whereby said another portion is adapted to engage said motor housing side wall at two spaced apart areas of line contact.

11. The device as defined in claim 8 wherein at least some of said plurality of mounting legs include a support section extending from said first mounting end area at the other side thereof from said intermediate section, said support section including a support lip adapted to engage one of said motor housing ends for assisting in preventing axial movement of said motor relative to said band clamp.

12. In a motor mount arrangement of the type utilizing an adjustable band clamp closely peripherally received around the side wall of the motor housing and wherein a plurality of separate mounting legs each have a section thereof associated with said clamp band with the remote distal ends thereof fixedly mounted to some associated structure for mounting said motor in some desired position relative thereto, the improvement comprising:

said band clamp having a plurality of outwardly disposed dimples defining inwardly facing arcuate leg receiving areas at spaced intervals peripherally therearound with said dimples and resultant receiving areas longitudinally extending across at least a portion of the width of said band clamp from one side edge thereof and with each of said dimples including at least one through slot generally transversely thereacross; and, said mounting legs each including a first motor mounting end area having a generally circular cross-section with at least a longitudinal section thereof closely retainingly captured between said motor housing and band clamp in an associated one of said receiving areas, each of said first end area longitudinal sections including at least one radially outward extending flange having one portion thereof in registry with the at least one slot in that dimple defining the associated receiving area and another portion thereof engaging said motor housing side wall.

13. The improvement as defined in claim 12 wherein the radius of said first motor mounting end areas is generally no greater than the radius of the associated generally arcuate receiving area.

14. The improvement as defined in claim 12 wherein said another portion of each said flange includes a relieved area such that said flange another portion engages said motor housing side wall at least at two spaced apart areas.

15. The improvement as defined in claim 14 wherein each flange has a generally annular configuration with said another portion relieved area being generally defined by a pair of side walls extending inwardly from the outer peripheral edge of said flange and converging toward each other at an included angle generally in the range of 150° to 170° whereby said another portion engages said motor housing side wall at two spaced apart areas of line contact.

16. The improvement as defined in claim 12 wherein said dimples and receiving areas extend entirely across the width of said band clamp between the opposed side edges thereof and wherein at least one of said plurality of legs further includes a support section extending from the first motor mounting end area, said support section including a support lip configured to engage an end area of said motor housing to assist in retaining said motor in a fixed position relative to said band clamp.

* * * * *